Figure 1:
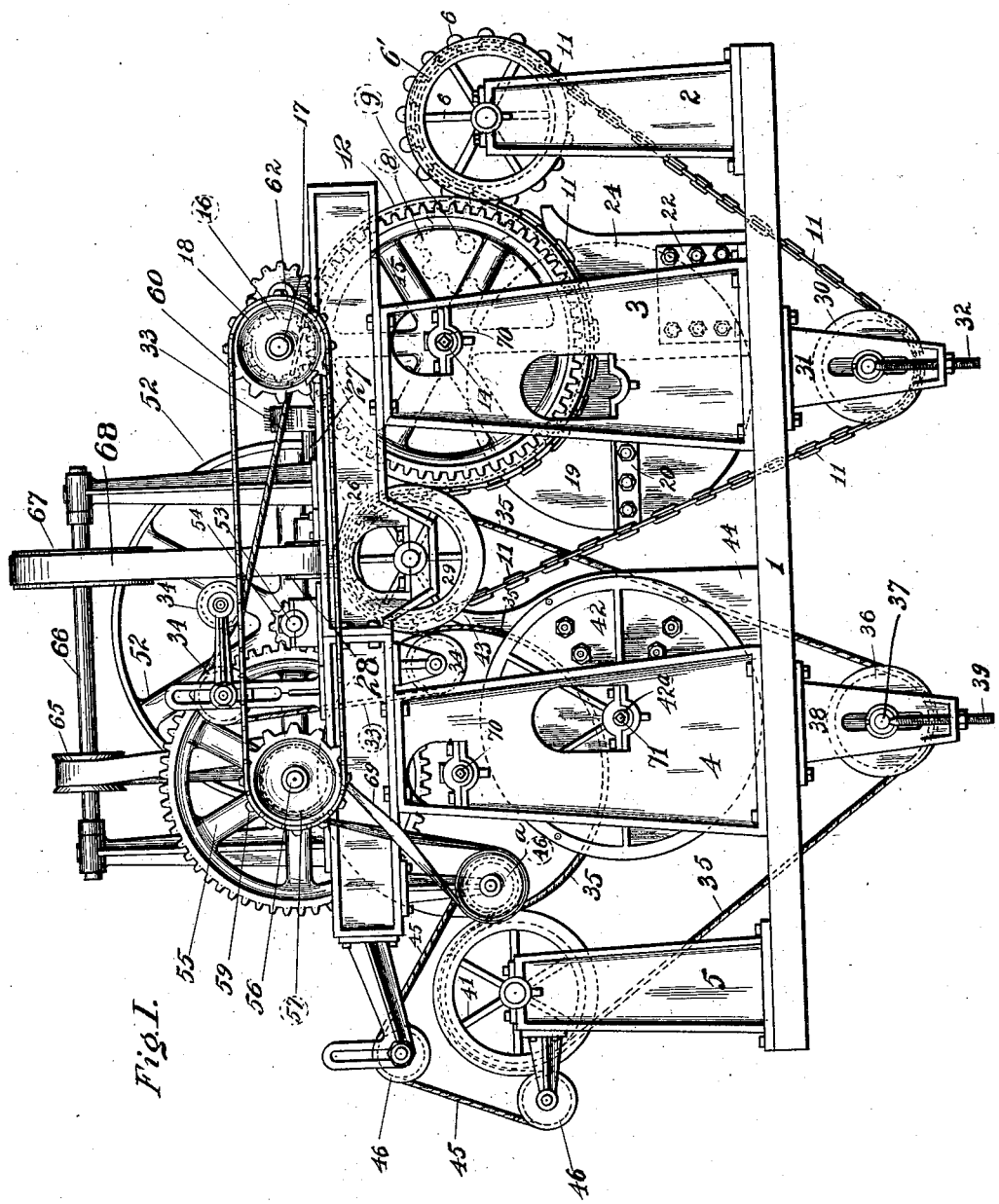

No. 744,281. PATENTED NOV. 17, 1903.
J. F. BEARD & R. HAYNE.
FOUR-WAY DEFIBRATOR.
APPLICATION FILED APR. 18, 1901.
NO MODEL. 6 SHEETS—SHEET 1.

Attest:
M. P. Smith
E. S. Knight

Inventors:—
Jas. F. Beard, and
Roger Hayne.
By Wright & Bert Att'ys

No. 744,281. PATENTED NOV. 17, 1903.
J. F. BEARD & R. HAYNE.
FOUR-WAY DEFIBRATOR.
APPLICATION FILED APR. 18, 1901.
NO MODEL. 6 SHEETS—SHEET 2.
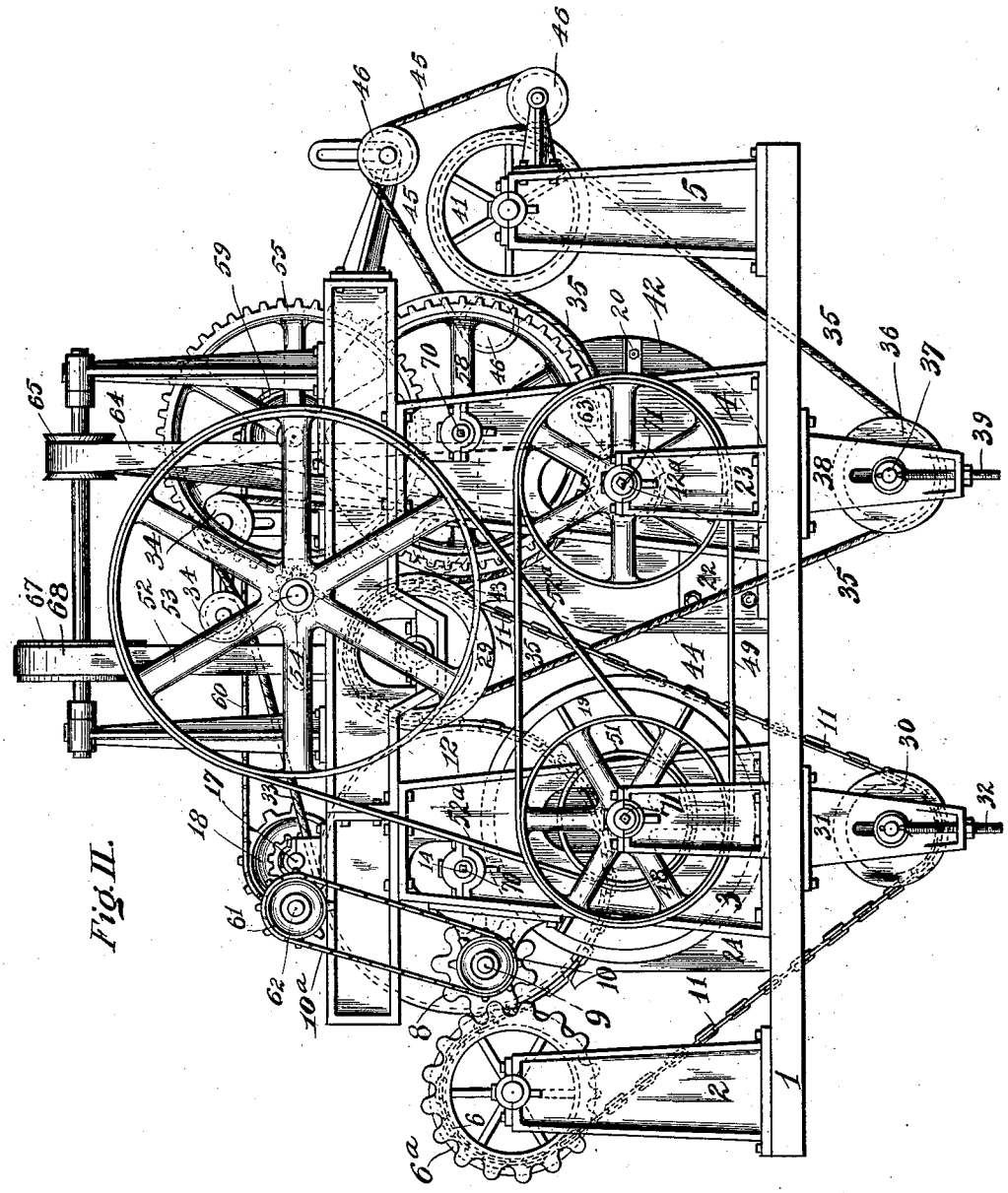
Fig. II.
Attest:
M. P. Smith
E. S. Knight
Inventors.
Jas. F. Beard and
Roger Hayne.
By Knight Bro. Att'ys.

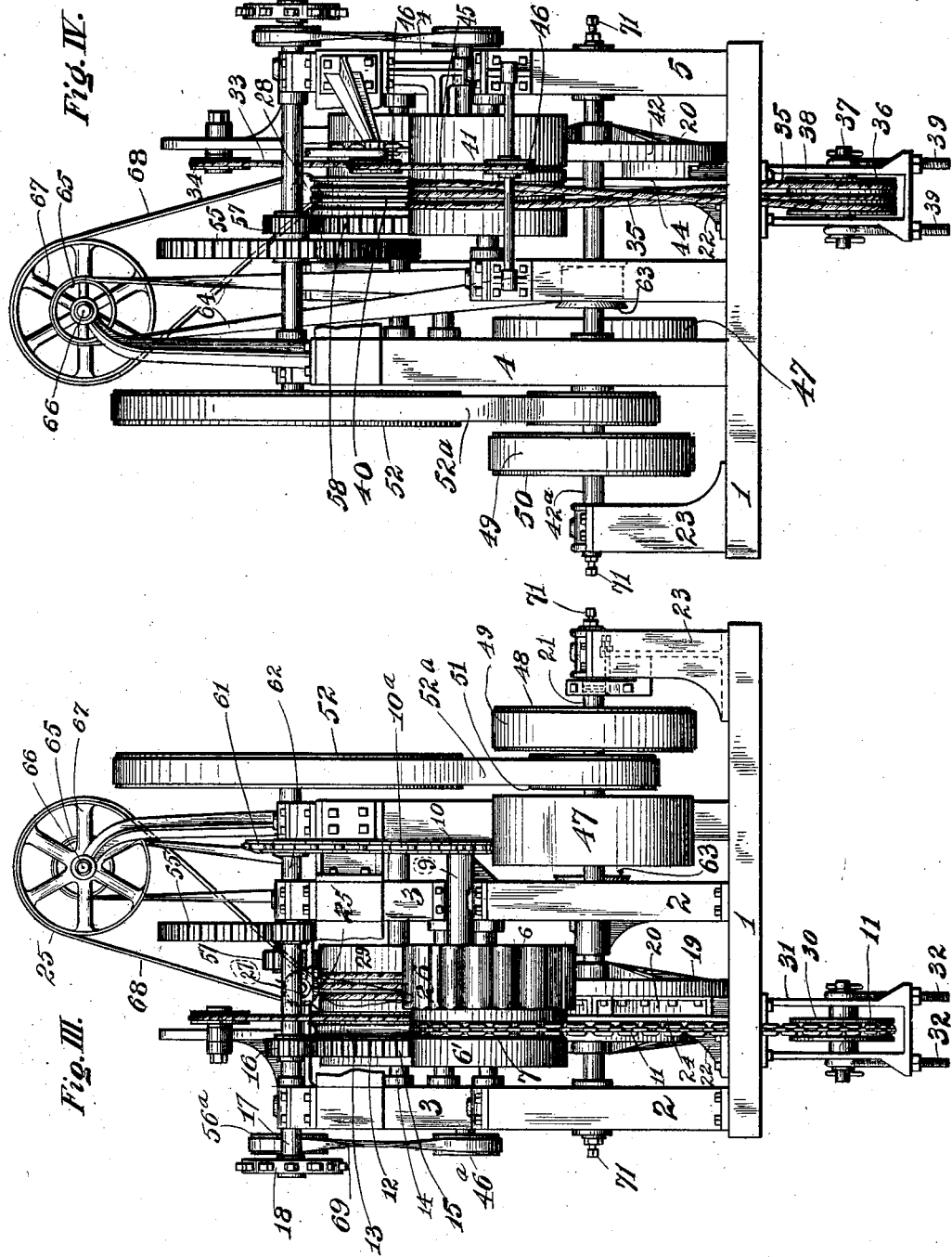

No. 744,281. PATENTED NOV. 17, 1903.
J. F. BEARD & R. HAYNE.
FOUR-WAY DEFIBRATOR.
APPLICATION FILED APR. 18, 1901.
NO MODEL. 6 SHEETS—SHEET 4.
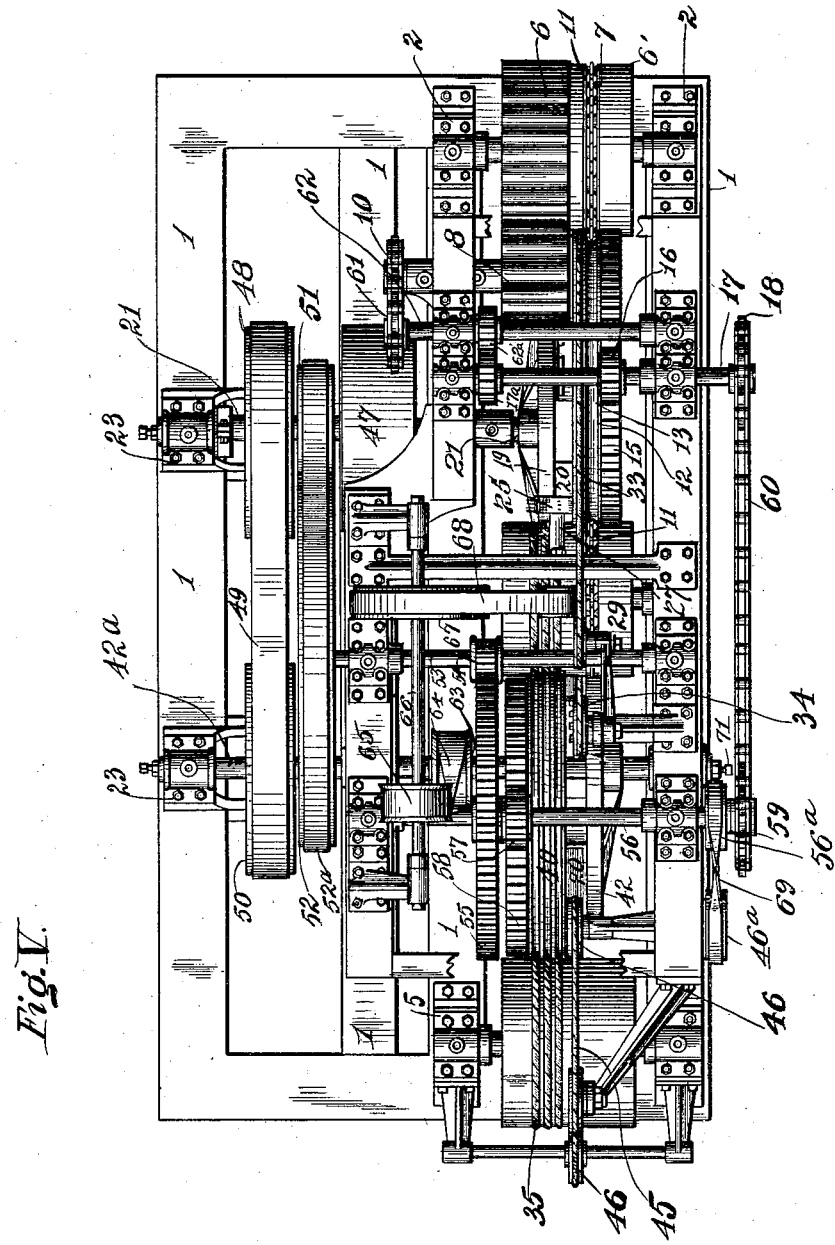
Fig. V.
Attest:
Inventors:—
Jas. F. Beard and
Roger Hayne.
by Wright Bro. Attys No. 744,281. PATENTED NOV. 17, 1903.
J. F. BEARD & R. HAYNE.
FOUR-WAY DEFIBRATOR.
APPLICATION FILED APR. 18, 1901.
NO MODEL. 6 SHEETS—SHEET 5.
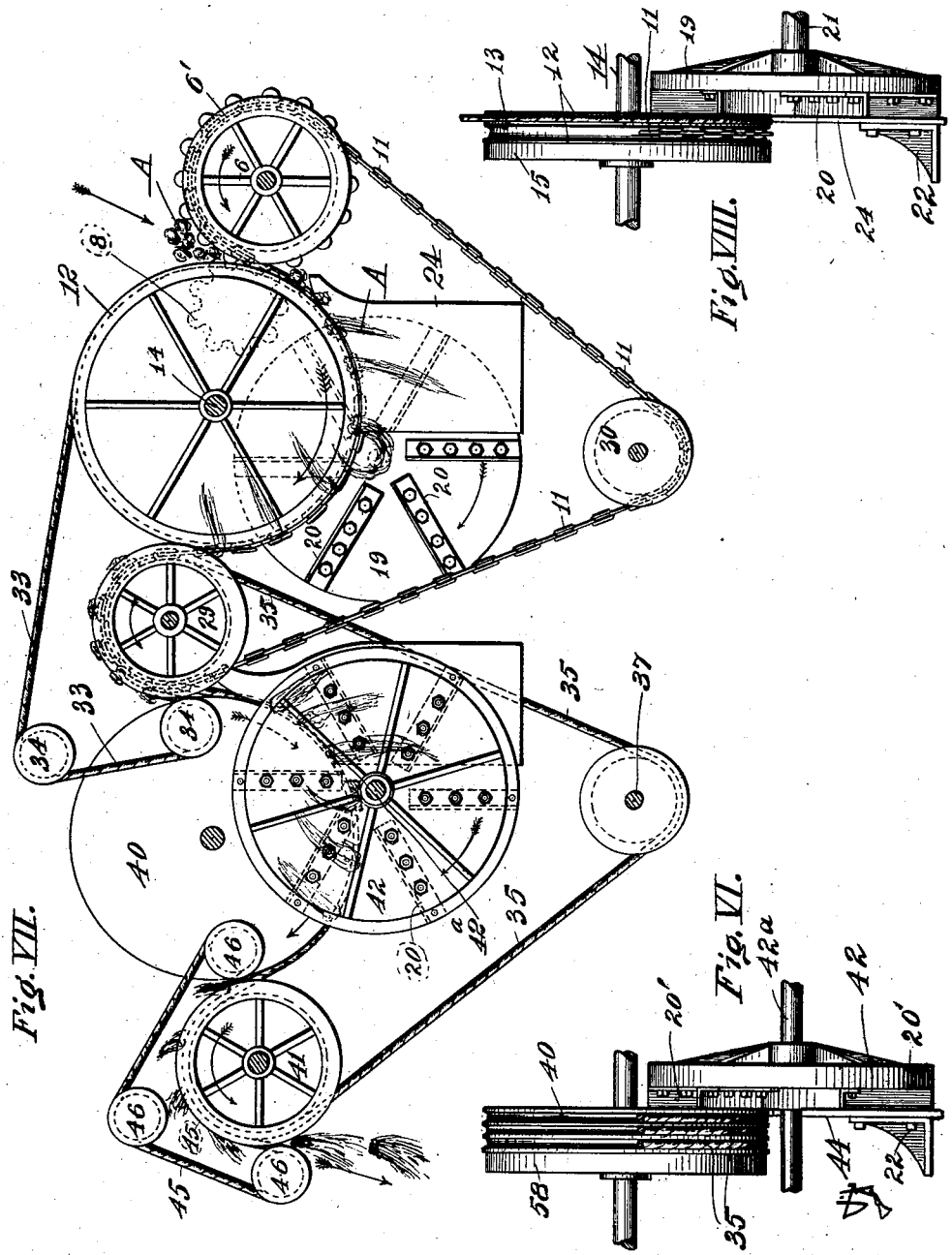
Attest:
Inventors.
Jas. F. Beard and
Roger Hayne.
by
Att'ys.

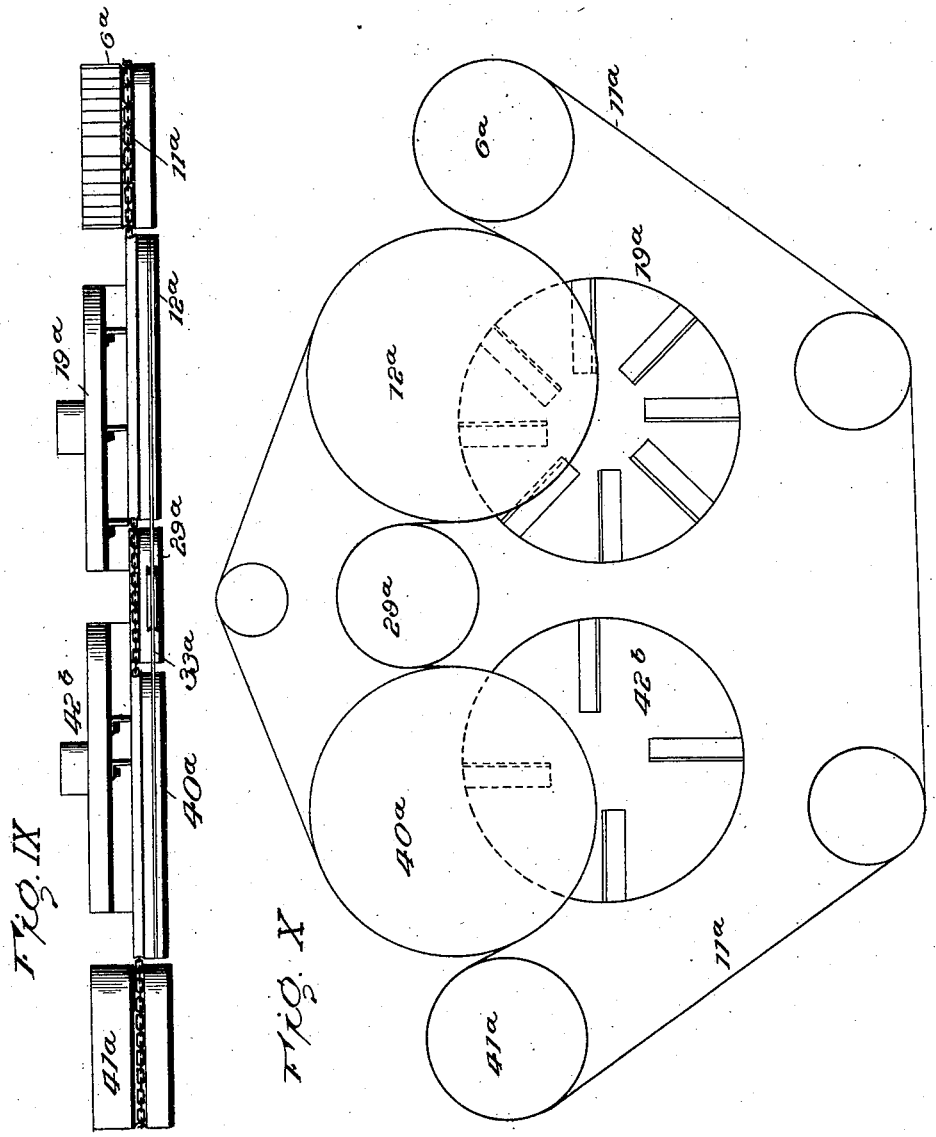

No. 744,281. Patented November 17, 1903.

UNITED STATES PATENT OFFICE.

JAMES F. BEARD, OF CARMEN STATION, MEXICO, AND ROGER HAYNE, OF ST. LOUIS, MISSOURI, ASSIGNORS TO BEARD-HAYNE DEFIBERATOR COMPANY, OF ST. LOUIS, MISSOURI, A CORPORATION OF MISSOURI.

FOUR-WAY DEFIBRATOR.

SPECIFICATION forming part of Letters Patent No. 744,281, dated November 17, 1903.

Application filed April 18, 1901. Serial No. 56,498. (No model.)

*To all whom it may concern:*

Be it known that we, JAMES F. BEARD, a citizen of the United States, and a resident of Carmen Station, State of Coahuila, Mexico, and ROGER HAYNE, a subject of the King of Great Britain, and a resident of the city of St. Louis, in the State of Missouri, have invented certain new and useful Improvements in Four-Way Defibrators, of which the following is a full, clear, and exact description, reference being had to the accompanying drawings, forming part of this specification.

Our invention relates to a machine for use in removing or separating the fiber contained by vegetable-leaves, known as "four-way" defibrators, in which the leaf to be defibrated is first caught by one end thereof and scraped or defibrated on one side, then on the other side, the hold being then transferred to the opposite end of the leaf and the operation being then repeated, so that the end which was first held may also be defibrated.

Our invention also consists in features of novelty hereinafter fully described, and pointed out in the claims.

Figure I is a view in side elevation of our machine. Fig. II is a side elevation of the machine looking at the opposite side from that shown in Fig. I. Fig. III is an end view of the machine. Fig. IV is a view of the opposite end of the machine from that shown in Fig. III. Fig. V is a top or plan view. Fig. VI is an edge view of the second scraper-wheel and face-plates opposing it. Fig. VII is a side view of the stripping and conveying parts of the machine and illustrates the stripping operation. Fig. VIII is an edge view similar to Fig. VI, showing the initial scraper-wheel and face-plates. Fig. IX is a top or plan view of a modification. Fig. X is a view in diagram of the modification shown in Fig. IX.

1 designates a base surmounted by standards 2, 3, 4, and 5.

6 designates a main crushing feed-wheel mounted on a shaft journaled in the standards 2. The wheel 6 is of toothed or convoluted form and is opposed by a second crushing-wheel 8 of similar form, carried by a shaft 9, equipped with a sprocket-wheel 10, through the medium of which power is communicated to drive the crushing-wheel 8. Located alongside of the wheel 6 is a drum 6', that is provided with a groove 7, which receives a carrier-chain 11, by which the fiber-containing leaves to be defibrated are conducted, the leaves being delivered onto the wheel 6 and carried by said crushing-wheel 8 and chain into the machine, as will hereinafter appear.

12 designates a revolving face-plate mounted on a shaft 14, that is journaled in the standards 3 and is provided with a groove 13, that receives the chain 11. The shaft 14 carries a spur-wheel 15, (see Figs. I, III, and V,) that receives the driving connection of a pinion 16, carried by a shaft 17, equipped with a sprocket-wheel 18, that is driven by parts to be hereinafter described.

19 designates a scraper-wheel carried by a drive-shaft 21, that is mounted in a suitable bearing, as seen in Fig. V. The shaft of the scraper-wheel 19 is positioned at a lower level than that of the shaft 14 of the revolving face-plate 12, so that one side of the face-plate opposes only a portion of the scraper, as seen in Figs. I, II, VI, VII, and VIII. On the side of the scraper-wheel 19 that opposes the revolving face-plate 12 are a series of radially-arranged scraper-blades 20, that move in close proximity to the face-plate during the rotation of said face-plate and scraper-wheel, so that the fibrous leaves carried by the chain 11 around the periphery of the revolving face-plate are subjected to the action of the blades 20 to free the fiber from the covering by which it is incased in the leaves.

Located beside the scraper-wheel 19 at the point where the fibrous leaves (indicated by A) first contact with said scraper-wheel is a stationary face-plate 24, (see Figs. I, III, and VIII,) between which and the scraper-wheel the leaves first pass. As the leaves enter between the stationary face-plate 24 and the scraper-wheel 19 the blades 20 act upon them to remove the outer covering from one side of each leaf, as illustrated in Fig. VII. The continued rotation of the revolving face-plate 12 and the travel of the chain 11 thereagainst cause the partially-stripped leaves to be carried on across the vertical plane of the scraper-wheel 19, and as the leaves pass the axis of said scraper-wheel they are whipped upwardly by the blades 20, as seen in Fig. VII, thereby causing the leaves to be carried upwardly between the scraper-wheel and the revolving face-plate 12 with their unstripped sides facing the blades 20. The blades 20 are then permitted to act upon the unstripped sides of the leaves to remove the outer covering therefrom. At this time the main portions of the leaves have been freed from their outer coverings and the fiber alone remains except at the butt-end of each leaf. The continued travel of the chain 11 conveys the leaves upwardly around the periphery of the face-plate 12 past a traveling carding and combing band 25, that is provided with a series of prongs 26, by which the fiber is carded. The carding and combing band 25 travels on pulleys 27 and 28 and a driven pulley to be hereinafter mentioned. When the chain 11 has passed under the face-plate 12, its utility as a carrier for the leaves ceases, and it passes over an idler 29 and downwardly to and under an idler 30, that is adjustably mounted in hangers 31 by means of adjustment-screws 32, the said chain passing then back to the drum 6'.

As the leaves A emerge from the under edge of the revolving face-plate 12 and pass upwardly beyond said face-plate their butts are caught by a transfer-rope 33, that is arranged to travel in a groove contained by the revolving face-plate and on a series of idlers 34 and the idler 29, the leaves being thereby conveyed by said transfer-rope across the space occupied by the idler 29.

The idler 29 receives a series of endless carrier-cables 35, that pass upwardly from an idler 36, carried by a shaft 37, that is adjustably mounted in hangers 38, the said shaft being held by adjustment-screws 39. The course of the cables 35 is downwardly from the idler 29, over which they pass, and under a second revolving face-plate 40, thence upwardly over a discharge-wheel 41, and again downwardly to and beneath the idler 36. The second revolving face-plate 40 is similar in form to the revolving face-plate 12. Offset from the revolving face-plate 40 is a revolving scraper-wheel 42, similar to the scraper-wheel 19 and similarly positioned with relation to the revolving face-plate 40. As the partially-cleaned leaves are conveyed by the transfer-rope 33 onto the cables 35 by the chain 11, the cleaned fiber ends of said leaves pass with said cables downwardly between the cables and the periphery of the revolving face-plate 40, and as the butts of the leaves pass over the idler 29 they are freed from restraint. The fiber of the leaves is then caught by the cables 35 and conducted under the revolving face-plate 40, and the butts there enter at the point 43, (see Fig. VII,) between a stationary face-plate 44 (similar to that 24) and the scraper-wheel 42. As the butts of the leaves pass between the revolving scraper-wheel 42 and the stationary face-plate 44 and one side of each butt is acted upon by scraper-blades 20', carried by the scraper-wheel 42 to remove the outer covering from the fiber in the butts of the leaves, and as the movement of the parts continues, the butts of the leaves are whipped upwardly by the scraper-blades as the leaves pass the axis of the scraper-wheel, thereby causing the opposite sides of the butts of the leaves to be acted upon as the butts are carried between the scraper-wheel 42 and revolving face-plate 40 in similar manner to that described in connection with the scraper-wheel 19 and revolving face-plate 12. The butts of the leaves are thereby thoroughly stripped of their outer covering, and as they emerge from their passage between said face-plate and scraper-wheel the fiber passes directly over the delivery-wheel 41 to be discharged from the machine, falling downwardly from said delivery-wheel and onto a discharge-rope 45, that travels on the delivery-wheel 41 and on sheaves 46. The discharge-rope 45 conveys the fiber from the face-plate 40 over the delivery-wheel 41 and discharges it from the machine, as illustrated in Fig. VII.

We will now describe the driving mechanism of the machine.

47 designates the main driving-pulley, mounted on the shaft 21, that carries the scraper-wheel 19, as stated. On the same shaft 21 is a pulley 48, that is connected by a belt 49 to a pulley 50, mounted on the shaft 42ª, that carries the second scraper-wheel 42. On the shaft 21 is also a pulley 51, that receives a belt 52ª, through which power is transmitted from the shaft 21 to a driven pulley 52 on a shaft 53. On the shaft 53 is a pinion 54, that meshes with a spur-wheel 55, carried by a shaft 56, that is geared by a pinion 57 to a spur-wheel 58, fixed to the shaft of the second revolving face-plate 40 and by which said face-plate is revolved. Power from the shaft 56 to drive the first revolving face-plate 12 is transmitted through a sprocket-wheel 59, carried by said shaft 56, that is connected by an endless chain 60 to the sprocket-wheel 18 on the shaft 17. The pinion 16, carried by the shaft 17, meshes with the spur-wheel 15 and imparts movement thereto to effect the rotation of a revolving face-plate 12. The crushing-wheel 8 is driven by power applied to the sprocket-wheel 10 of the shaft of said wheel, around which an endless chain 10ª passes, and thence to a sprocket-wheel 61, carried by a shaft 62, that has driving connection with the spur-wheel 15 through pinions 62ª and 17ª. Power to drive the carding and combing band 25 is obtained through the pulley 63, mounted on the shaft 42ª, that receives a belt 64, which passes upwardly and over a pulley 65 on a shaft 66, that also carries a pulley 67. The pulley 67 receives the hackling-band, which passes therefrom to the pulleys 27 and 28. One of the sheaves 46, on which the delivery-rope 45 travels, is driven by a belt 69, (see Figs. I, III, and V,) that is applied to a pulley 56ª on the shaft 56 and a pulley on the shaft that carries said sheave 46.

In order to provide for the lateral adjustment of the revolving face-plates 12 and 40, we employ set-screws 70, that bear against the ends of the shafts of said plates (see Figs. III and IV) and through means of which the shafts may be moved longitudinally to the proper degree, as desired, and to provide for the adjustment of the shafts 21 and 42ª by which the revolving scraper-wheels are carried we utilize set-screws 71, by which the said shafts may be shifted longitudinally to accommodate any desired lateral adjustment of the scraper-wheels.

In Figs. IX and X we have shown a modification wherein the leaves may be carried directly across the entire machine, being held throughout their entire course by the butts, this construction providing for the stripping of the main portion of the leaves only, leaving the butts unstripped. In this form of construction 6ª designates the main crushing and feed wheel, and 11ª the carrier-chain. The carrier-chain 11ª passes entirely across the machine, first downwardly under the revolving face-plate 12ª, then over the idler 29ª and under the second revolving face-plate 40ª and over the delivery-wheel 41ª, and downwardly beneath idlers to return to the starting-point. The fibers are conveyed from the revolving face-plate 12ª to the face-plate 40ª by a transfer-rope 33ª, that passes over the idler 29ª. 19 designates the first scraper-wheel, and 42ᵇ the second scraper-wheel.

We claim as our invention—

1. In a machine of the class described, the combination of a revolving face-plate, a revolving scraper-wheel having blades on the side face thereof opposing said face-plate, and means for conducting the leaves to be acted upon to said scraper-wheel and face-plate, substantially as described.

2. In a machine of the class described, the combination of a revolving face-plate, a revolving scraper-wheel having blades on the side face thereof opposing said revolving face-plate, a stationary face-plate located beside said scraper-wheel, and means for conducting the leaves to be acted upon to and between said scraper-wheel and said face-plates, substantially as described.

3. In a machine of the class described, the combination of a pair of crushing-wheels, a revolving face-plate, a revolving scraper-wheel having blades on the side face thereof opposing said face-plate, and means for conducting the leaves to be acted upon to and between said scraper-wheel and said face-plate, substantially as described.

4. In a machine of the class described, the combination of a revolving face-plate, a revolving scraper-wheel having blades on the side face thereof opposing said face-plate, a second revolving face-plate and revolving scraper-wheel, and means for conducting the leaves to be acted upon to the first-mentioned face-plate and scraper-wheel, and means for conducting the leaves from the first-mentioned face-plate and scraper-wheel to the second face-plate and scraper-wheel, substantially as described.

5. In a machine of the class described, the combination of a revolving face-plate, a revolving scraper-wheel having blades on the side face thereof opposing said face-plate, an endless carrier arranged to conduct the leaves to be acted upon to said revolving face-plate and scraper-wheel, a second revolving face-plate, a second revolving scraper-wheel having blades on the side face thereof opposing said second face-plate, and an endless carrier arranged to receive the leaves from said first-named revolving face-plate and scraper-wheel and conduct them between said second revolving face-plate and scraper-wheel, substantially as described.

6. In a machine of the class described, the combination of a revolving face-plate, a revolving scraper-wheel having blades on the side face thereof opposing said face-plate, an endless carrier arranged to conduct the leaves to be acted upon to said revolving face-plate and scraper-wheel, a transfer-rope arranged to receive and convey said leaves as they pass from said revolving face-plate and scraper-wheel, a second revolving face-plate and a second revolving scraper-wheel and an endless carrier arranged to receive the leaves from said transfer-rope and conduct them to said second revolving face-plate and scraper-wheel, substantially as described.

7. In a machine of the class described, the combination of mechanism for holding one end of the leaf to be defibrated, means for defibrating first one side and then the other side of the opposite end of said leaf without altering the hold upon the leaf, mechanism for transferring the hold to the defibrated end of said leaf, and means for defibrating first one side and then the other side of the first-mentioned end of said leaf.

In testimony whereof we have hereunto affixed our signatures in presence of witnesses.

JAMES F. BEARD.
ROGER HAYNE.

Witnesses to the signature of James F. Beard:
FERGUS C. HAYNE,
PHILIP CARROLL.

Witnesses to the signature of Roger Hayne:
WM. P. NELSON,
E. S. KNIGHT.